US007655058B2

(12) United States Patent
Smith

(10) Patent No.: US 7,655,058 B2
(45) Date of Patent: Feb. 2, 2010

(54) CYCLONIC VACUUM CLEANER

(75) Inventor: David Benjamin Smith, Glasgow (GB)

(73) Assignee: Hoover Limited, Merthyr Tydfil (GB)

( * ) Notice: Subject to any disclaimer, the term of this patent is extended or adjusted under 35 U.S.C. 154(b) by 288 days.

(21) Appl. No.: 11/728,022

(22) Filed: Mar. 23, 2007

(65) Prior Publication Data

US 2007/0220845 A1 Sep. 27, 2007

(30) Foreign Application Priority Data

Mar. 23, 2006 (GB) ................................ 0605788.9

(51) Int. Cl.
*B01D 45/12* (2006.01)

(52) U.S. Cl. ............................ 55/349; 55/343; 55/345; 55/346; 55/DIG. 3; 15/353

(58) Field of Classification Search .................. 55/345, 55/346, 349, 428, 429, DIG. 3, 343, 459.1; 96/415, 416; 15/353
See application file for complete search history.

(56) References Cited

U.S. PATENT DOCUMENTS

| | | | | |
|---|---|---|---|---|
| 2,171,248 | A | 8/1939 | Berkel | |
| 2,904,130 | A * | 9/1959 | Chapler, Jr. | 55/344 |
| 3,425,192 | A * | 2/1969 | Davis | 55/345 |
| 4,820,427 | A | 4/1989 | Ryynänen | |
| 6,083,292 | A * | 7/2000 | Fumagalli | 55/345 |
| 6,344,064 | B1 * | 2/2002 | Conrad | 55/337 |
| 6,607,572 | B2 * | 8/2003 | Gammack et al. | 55/343 |
| 6,810,558 | B2 * | 11/2004 | Lee | 15/353 |
| 6,840,972 | B1 * | 1/2005 | Kim | 55/337 |
| 7,419,521 | B2 * | 9/2008 | Oh et al. | 55/337 |
| 2005/0050863 | A1 * | 3/2005 | Oh | 55/345 |
| 2005/0050864 | A1 * | 3/2005 | Oh et al. | 55/345 |
| 2005/0050865 | A1 * | 3/2005 | Oh et al. | 55/345 |
| 2005/0172584 | A1 * | 8/2005 | Oh et al. | 55/345 |
| 2005/0172585 | A1 * | 8/2005 | Oh et al. | 55/345 |
| 2005/0172586 | A1 * | 8/2005 | Oh et al. | 55/345 |

(Continued)

FOREIGN PATENT DOCUMENTS

EP 1 652 458 A2 5/2006

(Continued)

OTHER PUBLICATIONS

GB Search Report dated Jun. 20, 2006, Application No. GB0605788.9 (1 page).

*Primary Examiner*—Robert A. Hopkins
*Assistant Examiner*—Sonji Turner
(74) *Attorney, Agent, or Firm*—TraskBritt

(57) ABSTRACT

A vacuum cleaner includes a pair of low efficiency cyclones connected upstream of respective groups of high efficiency cyclones by respective elongate ducts. The high efficiency cyclones of each group can be arranged in a line or a cluster extending away from their respective low efficiency cyclone, such that at least a portion of one side of the low efficiency cyclone is exposed. The high efficiency cyclones can be connected to their respective elongate ducts at respective positions along the length thereof, with each cyclone comprising an inlet connecting to the duct. The inlets of each high efficiency cyclone can be stepped along the axis of the duct with respect to the inlet of each other cyclone of the group, in a direction which extends across the width of the duct.

17 Claims, 5 Drawing Sheets

U.S. PATENT DOCUMENTS

| | | | | |
|---|---|---|---|---|
| 2005/0229554 | A1 * | 10/2005 | Oh et al. | 55/346 |
| 2005/0251951 | A1 * | 11/2005 | Oh et al. | 15/353 |
| 2005/0252180 | A1 * | 11/2005 | Oh et al. | 55/345 |
| 2006/0059871 | A1 * | 3/2006 | Han et al. | 55/345 |

FOREIGN PATENT DOCUMENTS

| | | | | |
|---|---|---|---|---|
| GB | 2399780 | | * | 9/2004 |
| GB | 2 406 065 | A | | 3/2005 |
| GB | 2406064 | A | * | 3/2005 |
| GB | 2406066 | A | * | 3/2005 |
| GB | 2406067 | A | * | 3/2005 |
| WO | WO 02/067757 | A1 | | 9/2002 |
| WO | WO 2006/038750 | A1 | | 4/2006 |

* cited by examiner

CYCLONIC VACUUM CLEANER

FIELD OF THE INVENTION

This invention relates to a vacuum cleaner incorporating a cyclonic separator.

BACKGROUND OF THE INVENTION

Cyclonic separators are well known devices for separating dirt and dust from an air flow. Accordingly, such devices have gained popularity in the field of vacuum cleaners, since they can provide an alternative to the traditional dust bags.

It is well known that the overall separation efficiency of such so-called bagless vacuum cleaners can be improved by providing a first stage comprising a low efficiency cyclone for separating coarse dirt and dust from the airflow, and second stage comprising a higher efficiency cyclone mounted downstream of the first stage for separating finer dust particles from the partially cleaned air. U.S. Pat. No. 2,171,248 discloses one such cyclonic vacuum cleaner, in which the second higher efficiency stage is nested inside an outer annular low efficiency cyclone.

In order to further improve the separation efficiency of bagless vacuum cleaners, it has been proposed to mount a plurality of high efficiency cyclones in parallel downstream of the low efficiency cyclone. International Patent Application WO02/067757 discloses one such upright vacuum cleaner, in which the high efficiency cyclones are mounted in parallel in an annular array above the low efficiency cyclone. A disadvantage of this arrangement is that the overall length of the separation stages is too great for the arrangement to be used in more compact cylinder cleaners. A further disadvantage of the arrangement disclosed in WO02/067757 is that the array of high-efficiency cyclones depends into the low-efficiency cyclone structure, thereby dictating the size of the low-efficiency cyclone and limiting its efficiency.

UK Patent Application GB2406065 discloses a solution to the above-mentioned problem, in which the higher efficiency cyclones are mounted in an annular array concentrically around the low efficiency cyclone. In any cyclonic vacuum cleaner, the majority of the dirt and dust is collected by the low efficiency first stage and it is well known to form at least a portion of the side wall of the collection chamber of the first stage from a transparent material, so that the user can determine the fill level of the cleaner. However, a disadvantage of the arrangement of UK Patent Application GB2406065 is that the mounting of the higher efficiency stages around the lower efficiency stage obscures the user's view of the collection chamber of the first stage.

SUMMARY OF THE INVENTION

In accordance with a particular embodiment of the invention, there is provided a vacuum cleaner comprising a low efficiency cyclone separator and a plurality of higher efficiency cyclones mounted externally of the low efficiency cyclone, wherein at least two of said high efficiency cyclones are arranged at positions which are spaced apart from the rotational axis of the low efficiency cyclone by respective different distances.

The high efficiency cyclones can thus be arranged in a line or a cluster extending away from the low efficiency cyclone, such that at least a portion of one side of the low efficiency cyclone is exposed. Accordingly, the fill level of the low efficiency cyclone is not obscured and can easily be determined.

The configuration of the cyclones of the present invention is not subject to any of the constraints imposed on known cleaners. Accordingly, a wide range of different configurations can be adopted.

The high efficiency cyclones can be positioned away from the low efficiency cyclone and, thus, a plurality of higher efficiency cyclones (i.e., of smaller diameter) can preferably be used as the first stage, thereby reducing the dirt loading of the second stage cyclones and improving overall separation efficiency.

In another embodiment, a plurality of cyclones of said first stage can either be connected in series or in parallel to each other. The provision of a plurality of low efficiency parallel-connected cyclones reduces the dirt loading of the first stage, thereby further improving the separation efficiency of the cleaner.

In yet another embodiment, the outlet of each low efficiency cyclone can be connected to a plurality of respective high efficiency cyclones. In an alternative embodiment, the outlets of the low efficiency cyclones each can be connected to the same plurality of high efficiency cyclones. Optionally, the high efficiency cyclones can be arranged in parallel, in series, or in a series/parallel configuration with each other.

In a particular embodiment, the high efficiency cyclones can be arranged in a cluster, one or more of said low efficiency cyclones being arranged peripherally of the cluster. Alternatively, the high efficiency cyclones can be arranged in a cluster around one or more low efficiency cyclones.

In yet another embodiment, a flow duct extends radially of the low efficiency cyclone or of each low efficiency cyclone, at least some of the high efficiency cyclones being connected to the flow duct. Optionally, the flow duct may be elongate, the high efficiency cyclones being positioned at respective positions along the length of the elongate duct. The cross-sectional area of the flow duct can vary along its length, preferably in proportion to the number of cyclones connected downstream thereof. In this manner, a balanced air flow can be achieved along the duct, with the result that the airflow can be equally divided into each high efficiency cyclone.

In accordance with an embodiment of the invention, there is provided a vacuum cleaner comprising a plurality of cyclones connected to an elongate flow duct at respective positions along the length thereof, each cyclone comprising an inlet connecting to the duct, the inlets being stepped with respect to each other along the axis of the duct in a direction which extends across the width of the duct. The stepped configuration of the inlets across the ducts can avoid having to route the ducts over or around the upstream cyclone(s). Optionally, the cyclones can be stepped with respect to each other along the axis of the duct in a direction which extends transverse the longitudinal axis of the duct.

The cyclones can comprise a rotational axis, the rotational axis of each cyclone can be parallel and can extend perpendicular to the longitudinal axis of the duct. The duct can comprise a first planar wall portion and a second opposed wall portion which can converge in a stepped manner towards the first planar wall portion, the cyclones comprising inlets positioned along said convergent second wall portion. Optionally, the first and second wall portions respectively form the roof and floor of the duct, the cyclones depending from the floor.

BRIEF DESCRIPTION OF THE DRAWINGS

Embodiments of this invention will now be described by way of examples only and with reference to the accompanying drawings in which.

DETAILED DESCRIPTION OF THE PREFERRED EMBODIMENTS

Figure 1:
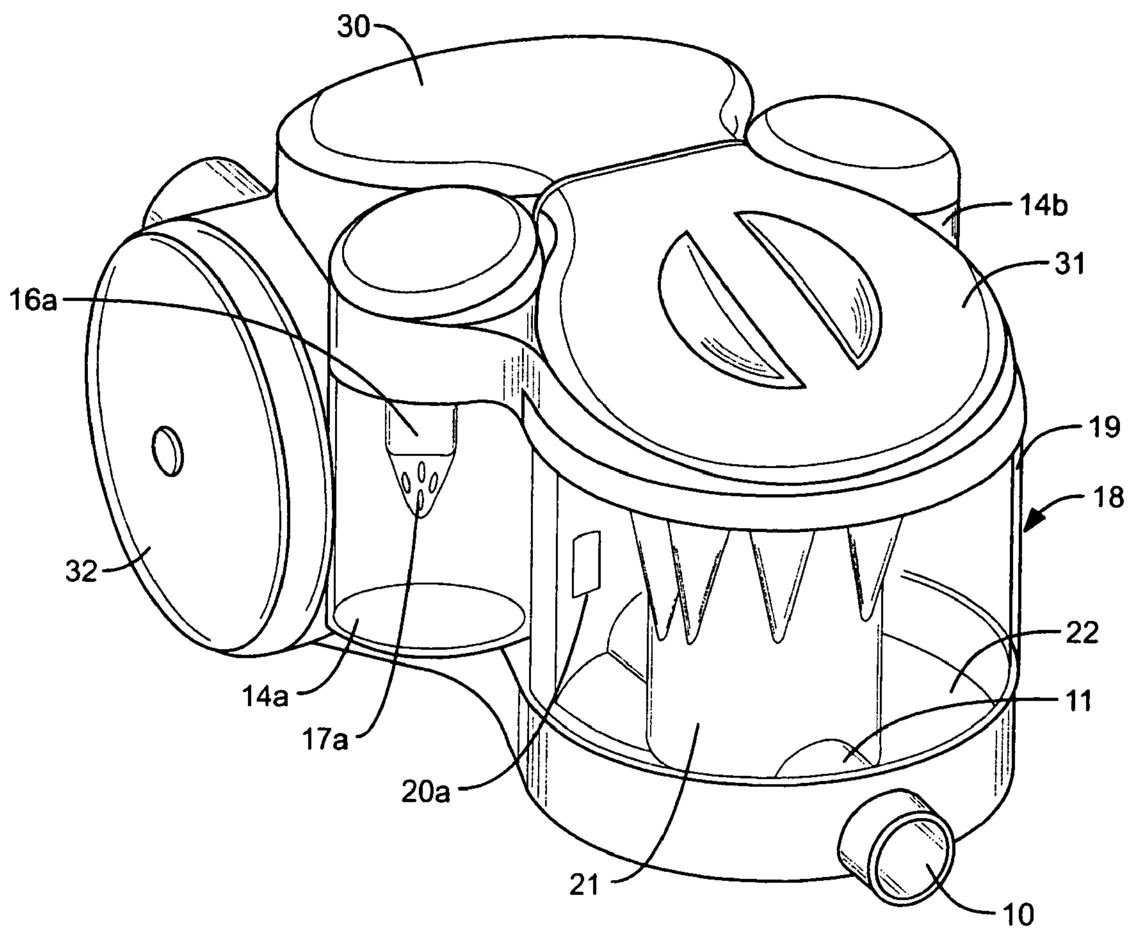
FIG. 1 is a perspective view of an embodiment of vacuum cleaner in accordance with this invention.
Figure 2:
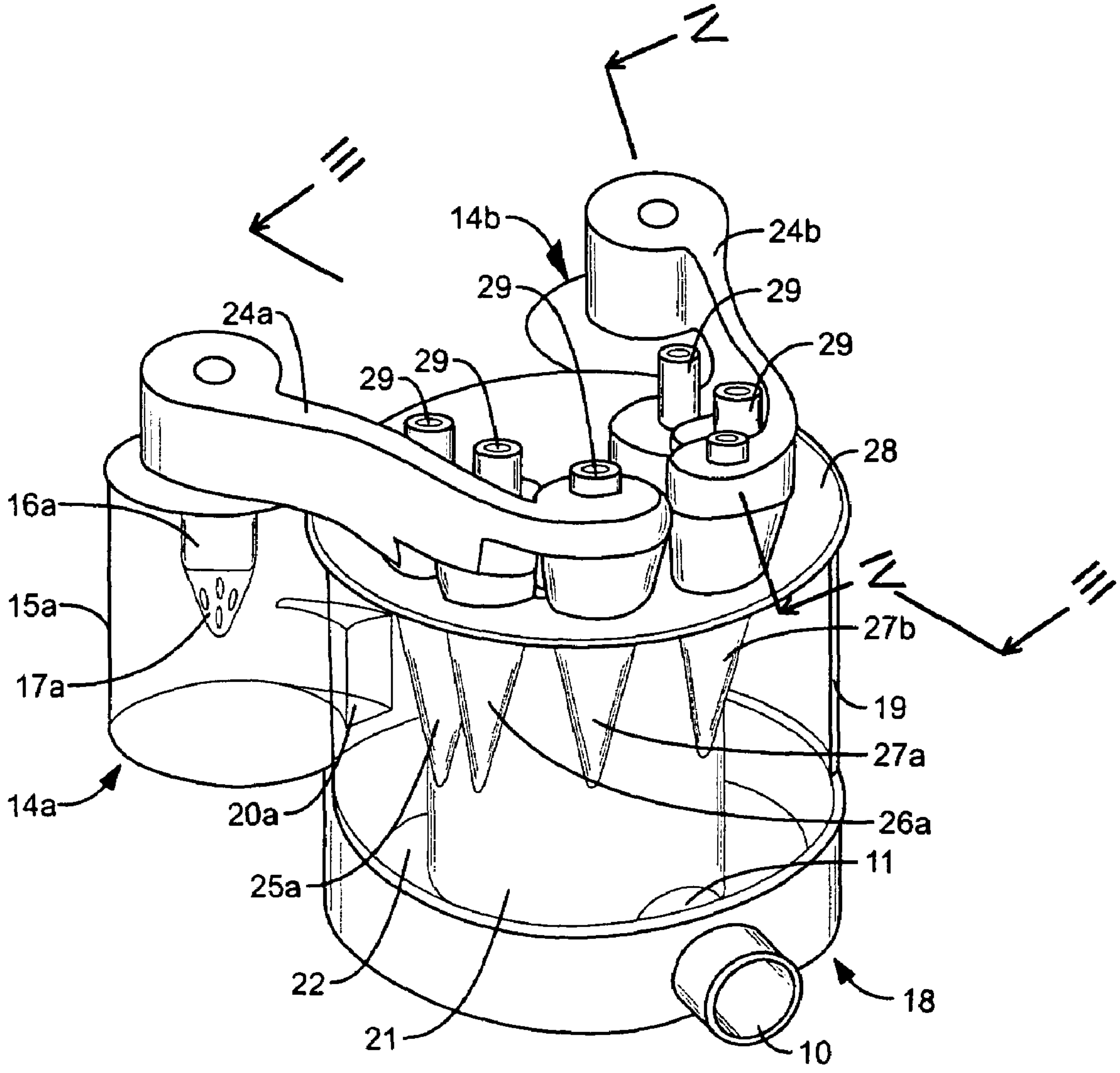
FIG. 2 is a perspective view of the separation stages of the cleaner of FIG. 1.
Figure 3:
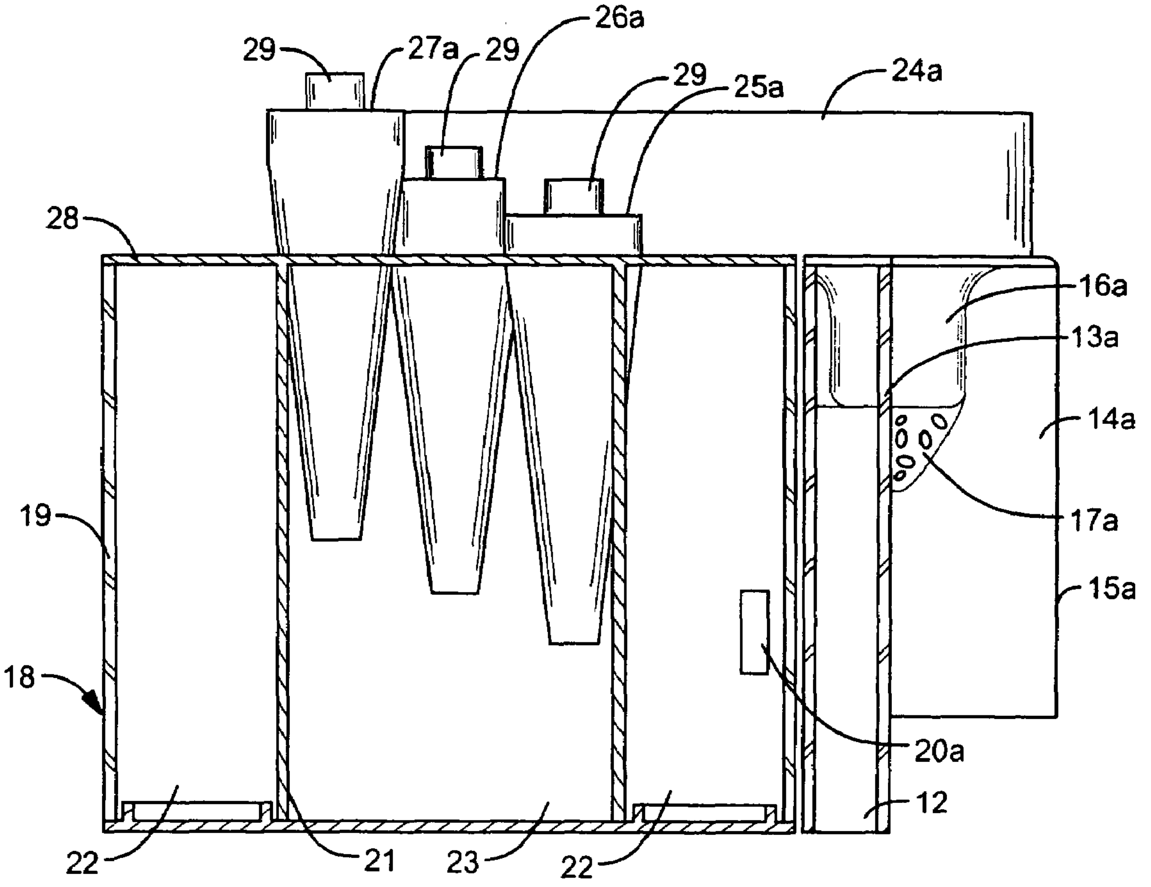
FIG. 3 is a sectional view along the line III-III of FIG. 2.
Figure 4:
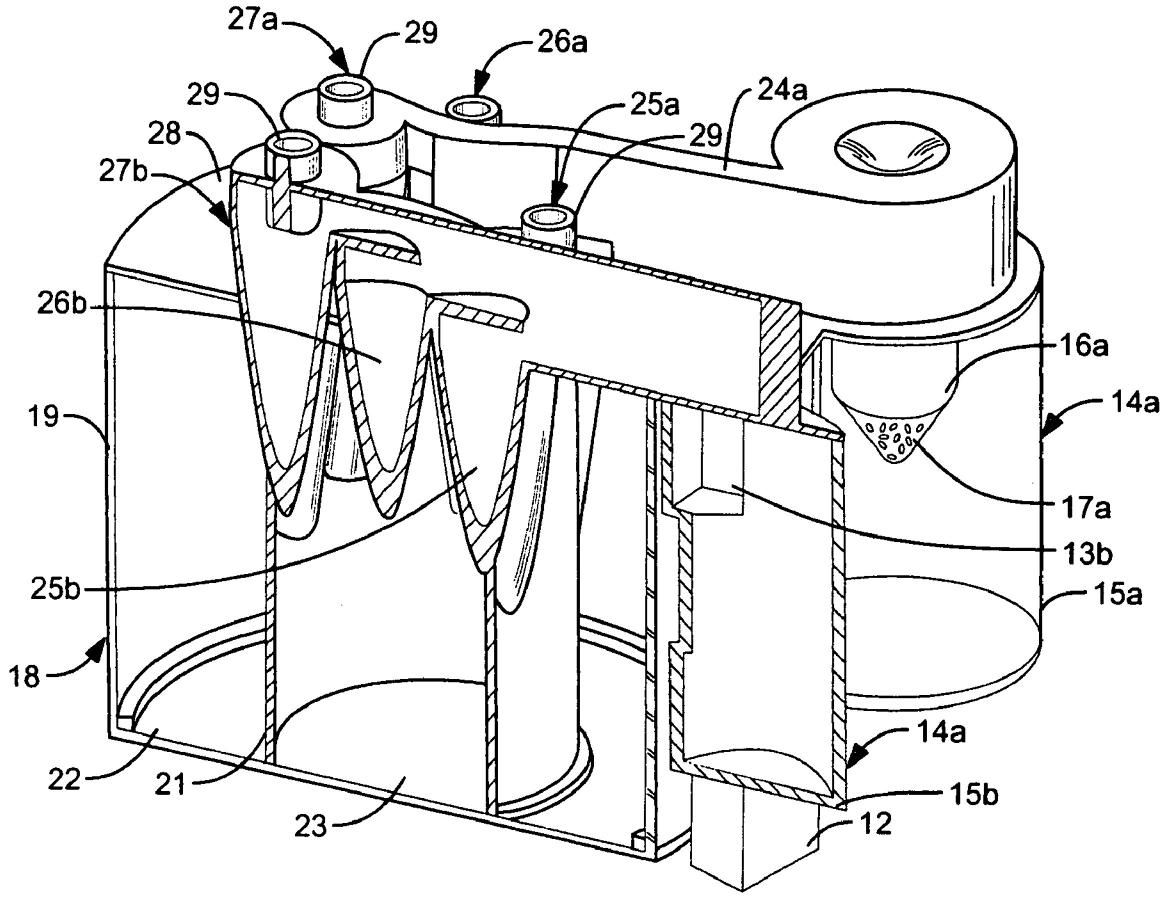
FIG. 4 is a sectional view along the line IV-IV of FIG. 2.
Figure 5A:
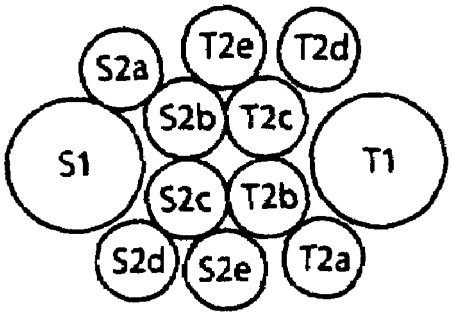
FIGS. 5A to 5E are schematic views of the arrangement of the cyclonic stages of alternative embodiments of vacuum cleaners in accordance with this invention.
Figure 5B:
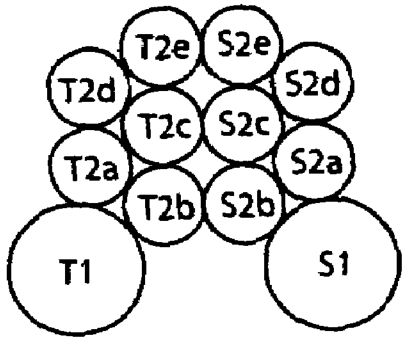
Figure 5C:
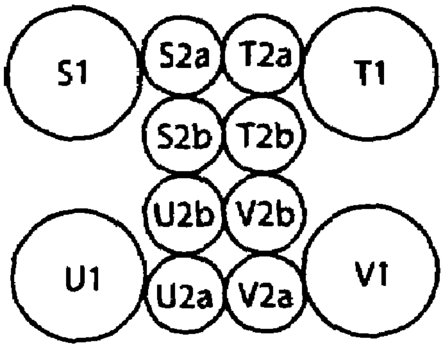
Figure 5D:
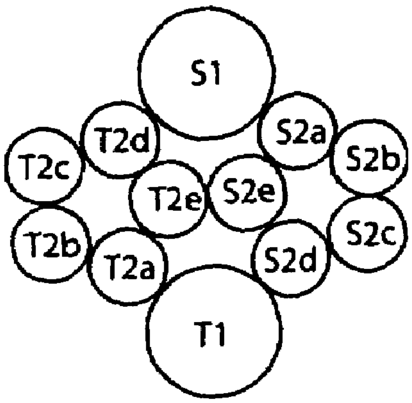
Figure 5E:
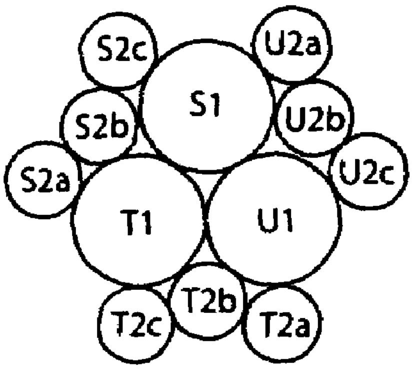

Referring to FIGS. 1 to 4 of the drawings, there is shown a canister type vacuum cleaner. As will be explained hereinafter, the vacuum cleaner can comprise two separation portions, which are symmetrically mounted on opposite sides of the cleaner and which are fluidly connected in parallel between a dirty air inlet and a clean air outlet of the cleaner. Each separation portion can comprise a low efficiency cyclone connected upstream of a plurality of parallel-connected low efficiency cyclones. For clarity, the same reference numerals are used for like parts of the two separation portions, with the parts of the left and right hand portions of FIG. 1 being given the suffixes "a" and "b," respectively. The operation of the separation portions will solely be described with reference to the left hand portion of FIG. 1, although it will be appreciated that the right hand portion is of identical construction and functions in the same manner.

In the particular embodiment shown in FIG. 1, the vacuum cleaner comprises a dirty air inlet 10 at its front for connecting to a floor cleaning tool via an elongate flexible hose (not shown). The inlet 10 is connected to a horizontal inlet duct 11, which extends rearwardly through the cleaner. The rear end of the duct 11 is connected to a vertical upstanding duct 12 (shown in FIGS. 3 and 4), having a pair of openings 13*a* and 13*b* in the upper ends of its respective opposed side walls. The openings 13*a* and 13*b* lead tangentially into the upper ends of the low efficiency cyclone separators 14*a* and 14*b* of the respective separation portions.

The low efficiency cyclone separator 14*a* comprises a transparent tubular side wall 15*a*, which is closed at its lower end. A tubular outlet duct, or so-called vortex finder 16*a*, projects axially into the cyclone chamber from the upper end wall thereof. An apertured conical shroud 17*a* is disposed at the lower end of the outlet 16*a*.

A large cylindrical collection bin 18 is disposed at the front of the vacuum cleaner, partially between the two low efficiency cyclone separators 14*a*, 14*b*. The bin 18 comprises a tubular side wall 19 of transparent plastics material. The side wall 15*a* of the low efficiency cyclone separator 14*a* is formed with an outlet aperture 20*a* adjacent its bottom end wall, the aperture 20*a* leading into the dust collection bin 18 through the side wall 19 thereof.

A tubular boundary wall 21 is disposed inside the bin 18, the boundary wall 21 extending concentrically with the external side wall 19 of the bin 18. The boundary wall 21 divides the collection bin 18 to define an enlarged annular outer portion 22 and a smaller inner cylindrical portion 23.

The vortex finder 16 of the low efficiency cyclones 14*a* is connected to an elongate duct 24*a*, which extends tangentially from a scrolled outlet chamber disposed above the cyclones 14*a*. The ducts 24*a*, 24*b* extend over the top wall 28 of the dust collection bin 18 in a convergent manner towards the front of the cleaner.

The duct 24*a* is connected to three respective high efficiency cyclones 25*a*, 26*a*, and 27*a* disposed at respective positions along the length of the duct 24*a*. The high efficiency cyclones 25*a*, 26*a*, and 27*a* extend through the top wall 28 of the bin 18 and are formed integrally with the tubular boundary wall 21 disposed inside the bin 18. The side walls of the high efficiency cyclones 25*a*, 26*a*, and 27*a* are frustoconical in shape and are preferably of the same diameter and axial length. The lower end of each high efficiency cyclone 25*a*, 26*a*, and 27*a* opens into the inner portion 23 of the dust collection bin 18.

The longitudinal axis of each high efficiency cyclone (e.g., 25*a*) extends perpendicular to the longitudinal axis of the elongate duct 24*a* and parallel to the longitudinal axis of the other higher efficiency cyclones (e.g., 26*a* and 27*a*, and 25*b*, 26*b*, and 27*b*). Each high efficiency cyclone 25*a*, 26*a*, and 27*a* comprises a scrolled inlet, the relative position of the cyclones 25*a*, 26*a*, and 27*a* with respect to the transverse axis of the elongate inlet duct 24*a* being such that the inlets to the successive cyclones are stepped across the width of the duct 24*a* between the floor and roof walls thereof. The cross-sectional area of the duct 24*a* reduces by one third at the inlet to the first cyclone 25*a* and by the same amount at the inlet to the second cyclone 26*a*.

A fan unit comprising a motor-driven impeller is mounted in a body portion 30 of the cleaner, at a position disposed behind the collection bin 18 on the other side of the low efficiency cyclone separators 14*a* and 14*b*. A pair of rear wheels 32 are mounted to opposite sides of the body portion 30. A front wheel (not shown) is mounted under the collection bin 18.

In use, when the fan unit is energized, air is drawn from the floor cleaning tool and into the inlet 10. The air then flows rearwardly along the horizontal inlet duct 11, then upwardly along the vertical duct 12. The air then branches into two at the top of the duct 12, with half of the volume of the air tangentially entering each low efficiency cyclone separator 14*a* and 14*b* at the upper end thereof.

The air inside the low-efficiency cyclone separator 14*a* swirls downwardly, constrained by the tubular side wall 15*a* thereof. Any coarse dirt and dust in the airflow is thrown outwardly against the side wall 15*a*, where it moves downwardly towards the bottom wall of the cyclone and passes into the outer annular portion 22 of the collection bin 18 through the outlet aperture 20*a*.

The low efficiency cyclone 14*a* is of the reverse-flow type, whereby the swirling airflow descends through the cyclone chamber and then reverses to rise towards the vortex finder 16*a*. The apertured shroud 17*a* serves to prevent any course dirt and dust particles from being drawn into the vortex finder 16*a*. The partially cleaned air then flows upwardly along the tubular body of the vortex finder 16*a* and then tangentially outwards along the duct 24*a* leading to the high efficiency cyclone separators 25*a*, 26*a*, and 27*a*.

The fan unit is arranged to apply suction to the outlet ports 29 of each high efficiency cyclone separator 25*a*, 26*a*, and 27*a*, thereby causing the airflow along the duct 24 to be drawn equally into each cyclone 25*a*, 26*a*, 27*a*, 25*b*, 26*b*, and 27*b*. The reduction in the cross-sectional area of the duct 24*a* at each cyclone inlet helps to ensure that the airflow is evenly distributed into each of the parallel-connected high efficiency cyclones 25*a*, 26*a*, and 27*a*. The stepped arrangement of the cyclones 25*a*, 26*a*, and 27*a* avoids having to route the duct 24*a* over or around the upstream cyclones 25*a* and 26*a* to reach the downstream cyclone 27*a*.

The high efficiency cyclones 25*a*, 26*a*, and 27*a* function in a similar manner to the low efficiency cyclones 14*a* but their narrow conical shape causes a more intense force to be exerted on any finer dust particles in the air flow, thereby throwing the particles against the frustoconical wall. The separated dust particles exit the lowermost end of the cyclones into the inner portion 23 of the dust collection bin 18.

The majority of the dirt and dust is separated from the air flow by the low efficiency cyclones 14*a* and 14*b* of the first stage, the dust being collected in the outer annular portion 22 of the collection bin 18. It will be appreciated that it is relatively easy for the user to determine the fill level of the vacuum cleaner through the outer transparent wall 19 of the collection bin 18. When full, the collection bin 18 can be detached from the cleaner and emptied in the conventional manner.

Referring to FIGS. 5*a* to 5*e* of the drawings, alternative embodiments of vacuum cleaner in accordance with the present invention may comprise a plurality of low efficiency separation stages (e.g., S1, T1), connected upstream of respective high efficiency stages (e.g., S2*a*, S2*b*, S2*c* and T2*a*, T2*b*, T2*c*, etc.). The high efficiency stages maybe connected in parallel with each other, in series with each other or a combination of the two.

It will be appreciated by a person of skill in the art that a vacuum cleaner in accordance with the present invention is relatively simple in construction, yet provides a high degree of separation owing to the large number of cyclone separators.

While the preferred embodiments of the invention have been shown and described, it will be understood by those skilled in the art that changes of modifications may be made thereto without departing from the true spirit and scope of the invention.

What is claimed is:

1. A vacuum cleaner comprising a low efficiency cyclone having an inlet and an outlet;

a flow duct extending radially from the outlet of said low efficiency cyclone; and a plurality of higher efficiency cyclones each having an inlet connected to the flow duct and an outlet, said higher efficiency cyclones being mounted externally of the low efficiency cyclone, wherein at least two of said high efficiency cyclones are arranged at positions which are spaced apart from the rotational axis of the low efficiency cyclone by respective different distances, the inlet of each high efficiency cyclone being stepped with respect to each other along the axis of the duct in a direction which extends across the width of the duct.

2. A vacuum cleaner as claimed in claim 1, in which said high efficiency cyclones are arranged in a line extending away from said low efficiency cyclone.

3. A vacuum cleaner as claimed in claim 1, in which said high efficiency cyclones are arranged in a cluster extending away from said low efficiency cyclone.

4. A vacuum cleaner as claimed in claim 1, comprising a plurality of low efficiency cyclones connected in series with each other.

5. A vacuum cleaner as claimed in claim 1, comprising a plurality of low efficiency cyclones connected in parallel with each other.

6. A vacuum cleaner as claimed in claim 4, in which the outlet of each low efficiency cyclone is connected to a respective group of high efficiency cyclones.

7. A vacuum cleaner as claimed in claim 4, in which the outlets one low efficiency cyclone is connected to the same plurality of high efficiency cyclones as another low efficiency cyclone.

8. A vacuum cleaner as claimed in claim 1, in which said high efficiency cyclones are arranged in parallel, in series or in a series/parallel configuration with each other.

9. A vacuum cleaner as claimed in claim 1, in which said high efficiency cyclones are arranged in a cluster, said low efficiency cyclone being arranged peripherally of the cluster.

10. A vacuum cleaner as claimed in claim 1, in which said high efficiency cyclones are arranged in a cluster around said low efficiency cyclone.

11. A vacuum cleaner as claimed in claim 1, in which the flow duct is elongate, the high efficiency cyclones being positioned at respective positions along the length of the elongate duct.

12. A vacuum cleaner as claimed in claim 11, in which the cross-sectional area of the flow duct varies along its length.

13. A vacuum cleaner as claimed in claim 12, in which the cross-sectional area of the flow duct varies along its length in proportion to the number of cyclones connected downstream thereof.

14. A vacuum cleaner as claimed in claim 1, in which said low efficiency cyclones comprise a rotational axis, the rotational axis of each cyclone being parallel.

15. A vacuum cleaner as claimed in claim 1, in which said low efficiency cyclones comprise a rotational axis which extends perpendicular to the longitudinal axis of the duct.

16. A vacuum cleaner as claimed in claim 1, in which the duct comprises a first planar wall portion and a second opposed wall portion which converges towards the first planar wall portion, the inlets of said low efficiency cyclones being positioned along said convergent second wall portion.

17. A vacuum cleaner as claimed in claim 16, in which the first and second wall portions respectively form the roof and floor of the duct, said low efficiency cyclones extending from the floor.

* * * * *